G. P. MARINIER.
MECHANISM FOR TRANSMITTING MOTION.
APPLICATION FILED AUG. 23, 1918.
1,320,257.
Patented Oct. 28, 1919.
3 SHEETS—SHEET 1.
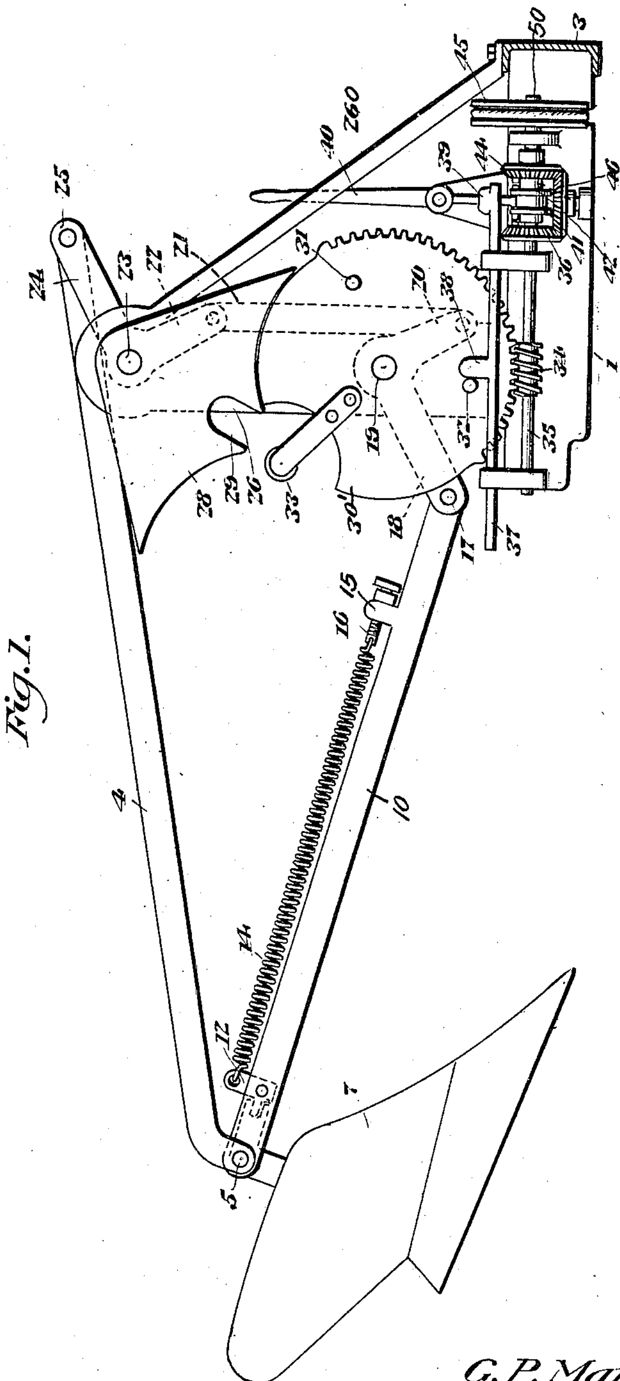
Witnesses
M. D. Sleeper
T. E. Turbin
Inventor
G. P. Marinier
By Victor J. Evans
Attorney G. P. MARINIER.
MECHANISM FOR TRANSMITTING MOTION.
APPLICATION FILED AUG. 23, 1918.
1,320,257. Patented Oct. 28, 1919.
3 SHEETS—SHEET 2.
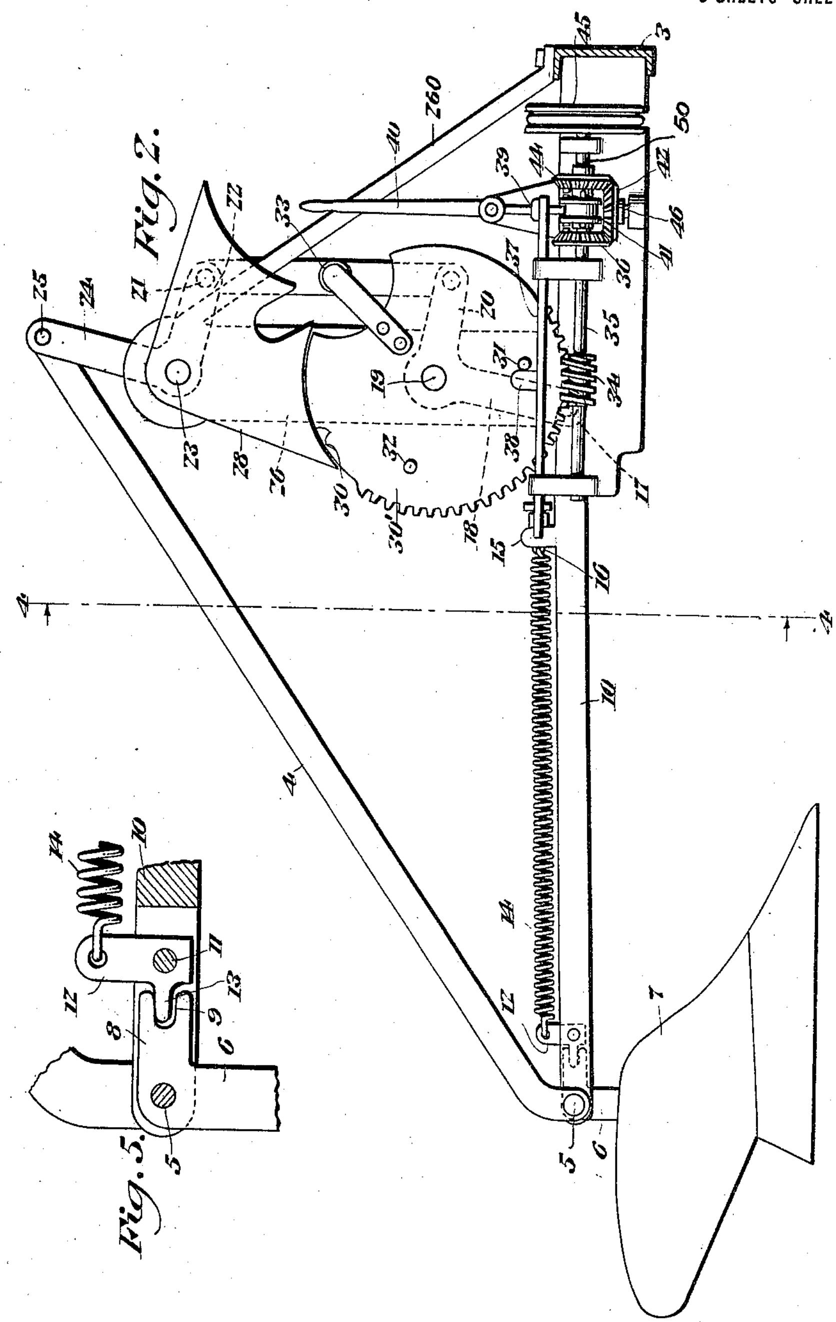
Witnesses
M. H. Slip
T. E. Trent
Inventor
G. P. Marinier
By Victor J. Evans
Attorney G. P. MARINIER.
MECHANISM FOR TRANSMITTING MOTION.
APPLICATION FILED AUG. 23, 1918.
1,320,257. Patented Oct. 28, 1919.
3 SHEETS—SHEET 3.
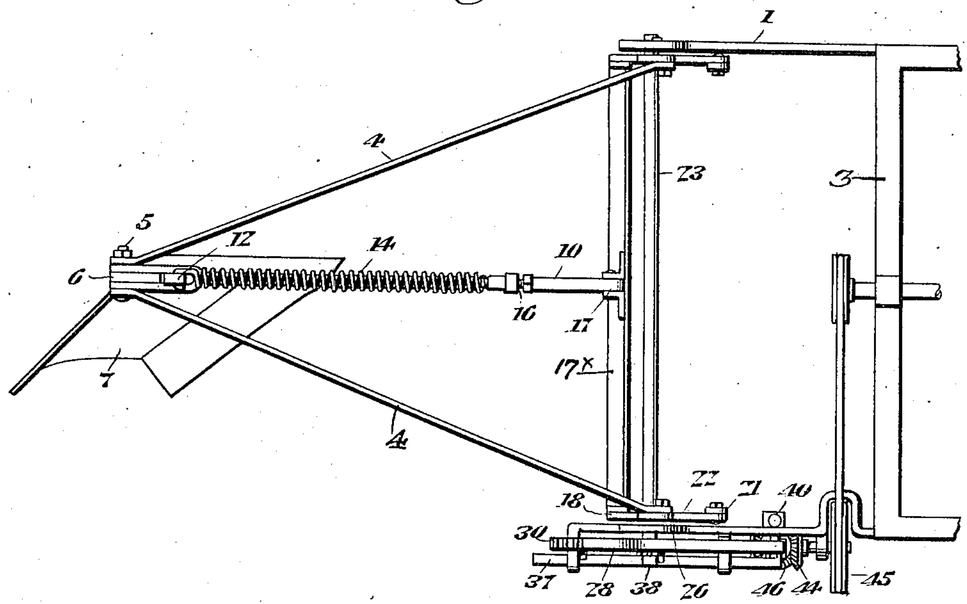
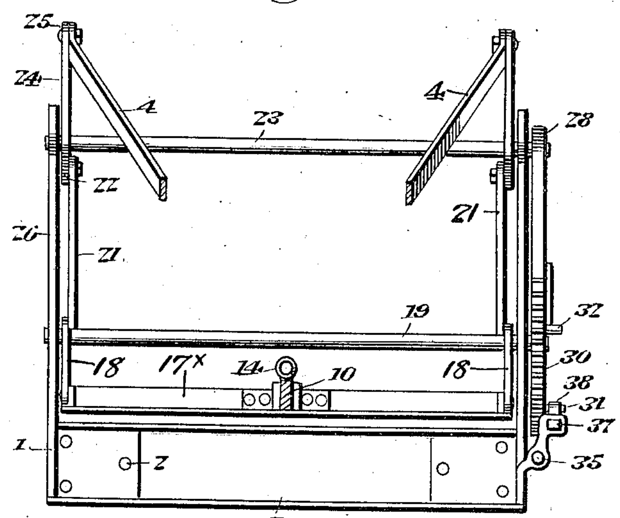
Witnesses
M. D. Sloper.
F. E. Turner
Inventor
G. P. Marinier
By Victor J. Evans
Attorney

UNITED STATES PATENT OFFICE.

GILBERT P. MARINIER, OF PONTIAC, MICHIGAN.

MECHANISM FOR TRANSMITTING MOTION.

1,320,257. Specification of Letters Patent. Patented Oct. 28, 1919.

Application filed August 23, 1918. Serial No. 251,159.

*To all whom it may concern:*

Be it known that I, GILBERT P. MARINIER, a citizen of the United States, residing at Pontiac, in the county of Oakland and State of Michigan, have invented new and useful Improvements in Mechanism for Transmitting Motion, of which the following is a specification.

My present invention pertains to mechanism for transmitting motion, and more particularly to mechanism designed for embodiment in farm implements intended for use in conjunction with tractors, and is designed more particularly as an improvement upon the farm implement constituting the subject of my Letters Patent No. 1,206,568, dated November 28, 1917.

The general object of my present invention is the provision of a peculiar and highly advantageous mechanism for transmitting motion.

Another object is the provision of such mechanism designed more particularly for use to advantage in combination with a tractor, including means for moving a plow or cultivator to and from working position; said means being so constructed and arranged that it is adapted to strongly maintain a plow or cultivator in working position, and also in idle raised position.

With the foregoing in mind the invention will be fully understood from the following description and claims when the same are read in connection with the drawings accompanying and forming part of this specification, in which:

Figure 1 is a general view in side elevation illustrating my improvement with the plow in raised or idle position.

Fig. 2 is a similiar view with the plow in working position.

Fig. 3 is a general top plan view.

Fig. 4 is a transverse section, taken in the plane indicated by the line 4—4 of Fig. 2.

Fig. 5 is an enlarged detail view illustrative of the retaining latch and of the parts that coöperate therewith.

Similar numerals of reference designate corresponding parts in all of the views of the drawings. The tractor frame is indicated by 1 and to the same is bolted at 2 what I denominate a plow attachment frame 3, the said denomination being intended to comprehend a cultivator attachment frame as well as a plow attachment frame.

4, 4 are plow or cultivator beams, to which is pivoted at 5 the shank 6 of the plow 7; the said shank having a forwardly reaching arm 8, notched at its forward end as indicated by 9. Connected to and extending forwardly from the pintle 5 is a link bar 10 to which is pivoted at 11 a retaining latch 12, having a protuberance 13 that is normally disposed in the notch 9 of the shank arm 8. The latch 12 extends laterally with respect to the link bar 10, and connected to said latch is one end of a retractible spring 14 the opposite end of which is adjustably connected with a lug 15 on the link bar through the medium of a threaded bolt 16 that bears in said lug. Manifestly by adjusting the bolt 16 the tension of the spring 14 may be readily regulated as conditions require; and it will also be understood that the spring 14 is sufficiently strong to hold the plow to its work under normal conditions, and yet in the event of the plow encountering a large stone or the like, the spring will give and permit disengagement of the plow shank from the latch 12 so as to permit the plow to clear the obstruction without being injured by the collision.

The link bar 10 is pivotally connected at 17 to a cross-bar $17^x$ between pendent arms 18 of bell cranks that are fixed on a shaft 19 and have their other arms 20 connected through links 21 with arms 22 of bell cranks that are fast on a transverse shaft 23 and have other arms 24, pivotally connected as indicated by 25, to the beams or beam members 4. The shafts 19 and 23 are mounted in standards 26 which are fixed to and rise from the plow attachment frame 3 as shown. The standards 26 are braced by diagonal struts 260 which are bolted at their lower ends to the frame 3 and are connected at their upper ends to the standards 26. Tight on the shaft 23 is a swinging member 28 having a notch 29 and concave edges 30, the latter being adapted to be opposed to the perimeter of a gear 30′ which is fast on the shaft 19 and is equipped with stop pins 31 and 32. The said gear 30′ is also equipped with a tappet 33.

Intermeshed with the gear 30′ is a worm 34 on a shaft 35 which shaft is journaled in the frame 3, and is equipped with a loose gear 36. Mounted in the frame 3 and disposed above the shaft 35 is a bar 37 having an upstanding arm 38 to coöperate with the stop pins and also having a portion 39 for the engagement of a gear shifting lever 40. The said lever 40 extends below the bar 37 and is engaged with a clutch member 41′—42 which is mounted to rotate with and move endwise on the shaft 35. Fixed at 45 on a shaft 50 is a drive pulley, and also fixed on the shaft 50 is a pivoted gear 44. The gears 36 and 44 are provided at their inner sides with clutch faces complementary to the clutch member 41—42. At 46 is a gear interposed between the gears 36 and 44 and designed when the clutch member 41—42 is in engagement with the clutch face of the gear 36 to transmit motion from the gear 44 to the gear 36, whereupon motion will be transmitted from the gear 36 to the shaft 35 through the medium of the clutch member 41—42. When the clutch member 41—42 is engaged with the gear 44, the shaft 35 will be rotated from the shaft 50 through the medium of the gear 44 and the clutch member 41—42. When the clutch member 41—42 is out of engagement with both gears 36 and 44, the shaft 35 will be left idle.

It will be gathered from the foregoing that through the medium of the gear shifter lever 40, the clutch member 41 42 may be moved endwise on the shaft 35 so as to engage either the gear 36 or the gear 44 as conditions require. It will also be gathered that when the gear 30 is rotated its tappet 33 will coöperate with the cam 28. Manifestly when the clutch member 41—42 is in neutral position as shown in Fig. 1, the worm 34 by coöperation with the gear 30 will strongly secure the plow beam in the position in which the same is placed.

Having described my invention what I claim and desire to secure by Letters-Patent is:

1. In means for the purpose described, the combination of a frame equipped with a standard, lower and upper bell cranks, a link connecting arms of said bell cranks, a beam connected to the other arm of the upper bell crank, a link bar connected with the beam and also with the other arm of the lower bell crank, and means for adjusting and adjustably fixing one of the bell cranks.

2. In means for the purpose described, the combination of a frame including a standard, lower and upper bell cranks, a link connecting arms of said bell cranks, a beam connected to the other arm of the upper bell crank, a link bar connected with the beam and also to the other arm of the lower bell crank, a swinging member fixed with respect to the upper bell crank and having concave edges and a notch between the same, a gear fixed with respect to the lower bell crank and having smooth peripheral portions to be opposed to said concave edges, and also having a tappet to engage said member, and means for adjusting and adjustably fixing the gear.

3. In means for the purpose described, the combination of a frame, a swinging arm mounted on the frame, a beam connected with said arm, a swinging member fixed with respect to said arm and having concave edges and a notch between the same, a gear having peripheral portions adapted to be opposed to said concave edges and also having a tappet to coöperate with the swinging member, and means for adjusting and adjustably fixing said gear.

4. In means for the purpose described, the combination of a frame, a swinging arm thereon, a beam connected with said arm, a swinging member fixed with respect to the arm and having concave edges and a notch between said edges, a gear having peripheral portions adapted to be opposed to said concave edges and also having a tappet to engage and move said swinging member, a connection intermediate the beam and the gear, and means for adjusting and adjustably fixing the gear.

5. In means for the purpose described, the combination of a frame, a swinging arm thereon, a beam connected to said arm, a swinging member fixed with respect to the arm and having concave edges and a notch between the same, a gear having peripheral portions adapted to be opposed to said convex edges and also having a tappet and stop pins, a connection intermediate the beam and the gear, a bar having a lateral portion to coöperate with said pins, a shaft, a worm carried by said shaft and intermeshed with the gear, and means whereby the shaft may be rotated in one direction or the other.

6. In means for the purpose described, the combination of a frame, lower and upper arms carried thereby, a beam connected with the upper arm, a link connecting the beam with the lower arm means connecting the lower and upper arms, a swinging member fixed with respect to the upper arm, and an operating member fixed with respect to the lower arm for actuating the swinging member and for adjustably maintaining said swinging member in position.

7. In means for the purpose described, the combination of a frame, a swinging beam connected therewith, a cam fixed with respect to and movable with the swinging beam, a gear having a tappet and equipped with stop pins, a bar having an arm to co-operate with said stop pins, a lever for moving said bar, a shaft, a worm on said shaft, and intermeshed with said gear, gears loose on the said shaft, power means on the shaft, an idler gear interposed between the gears on the said shaft, and a clutch member mounted to rotate with and to be moved by the said lever endwise of the shaft and into engagement with the gears on the shaft alternately.

In testimony whereof I affix my signature.

GILBERT P. MARINIER.

Copies of this patent may be obtained for five cents each, by addressing the "Commissioner of Patents. Washington, D. C."